(12) United States Patent
Weber et al.

(10) Patent No.: US 8,181,334 B2
(45) Date of Patent: May 22, 2012

(54) METHOD FOR PRODUCING WINDINGS FOR A DRY-TYPE TRANSFORMER

(75) Inventors: Benjamin Weber, Winterberg (DE); Frank Cornelius, Olsberg (DE); Jens Tepper, Brilon (DE); Oliver Becker, Schriesheim (DE); Paul Szasz, Plankstadt (DE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/116,564

(22) Filed: May 26, 2011

(65) Prior Publication Data

US 2011/0291791 A1    Dec. 1, 2011

(30) Foreign Application Priority Data

May 26, 2010    (EP) ..................................... 10005442

(51) Int. Cl.
    *G11B 5/127* (2006.01)
(52) U.S. Cl. ....................... 29/603.23; 336/96
(58) Field of Classification Search ..................... 336/96, 336/205–208, 223; 29/602.1, 605, 609, 603.23, 29/603.24, 603.25
    See application file for complete search history.

(56) References Cited

U.S. PATENT DOCUMENTS

| 4,474,845 | A  | * | 10/1984 | Hagerman et al. | ......... 428/297.4 |
| 6,221,297 | B1 | * | 4/2001  | Lanoue et al.   | ................. 264/219 |
| 2009/0083968 | A1 | * | 4/2009 | Meinke          | ........................ 29/602.1 |
| 2009/0313812 | A1 |   | 12/2009 | Pulnikov       | |

FOREIGN PATENT DOCUMENTS

| DE | 44 45 423 A1 | 6/1996 |
| EP | 0 116 367 A1 | 8/1984 |
| EP | 1 211 052 A1 | 6/2002 |
| EP | 1 941 523 A1 | 7/2008 |
| WO | WO 93/23461 A1 | 11/1993 |
| WO | WO 2007/033499 A1 | 3/2007 |

OTHER PUBLICATIONS

European Search Report issued on Nov. 15, 2010.

* cited by examiner

*Primary Examiner* — Tuyen Nguyen
(74) *Attorney, Agent, or Firm* — Buchanan Ingersoll & Rooney PC

(57) ABSTRACT

A method is provided for producing windings for a dry-type transformer with in each case one winding for the low voltage (LV winding) and one for the high voltage (HV winding). The LV and HV windings are each electrically insulated from one another and have layers which are electrically insulated from one another by virtue of, initially, the winding for the low voltage being produced from electrically conductive wire or tape material and an insulating layer including resin-impregnated fibre material. Prior to the application of the HV winding, the maximum insulating thickness for the layer insulation and the number of fiber rovings corresponding to this insulating thickness can be determined, and each winding layer and the associated insulating layer can be produced simultaneously with a physical offset with respect to one another. To produce the winding, fiber polymer layers can be applied, as layers of insulation, simultaneously with the winding conductor between the individual winding layers of the winding, and the finished winding is subjected to a curing operation.

20 Claims, 1 Drawing Sheet

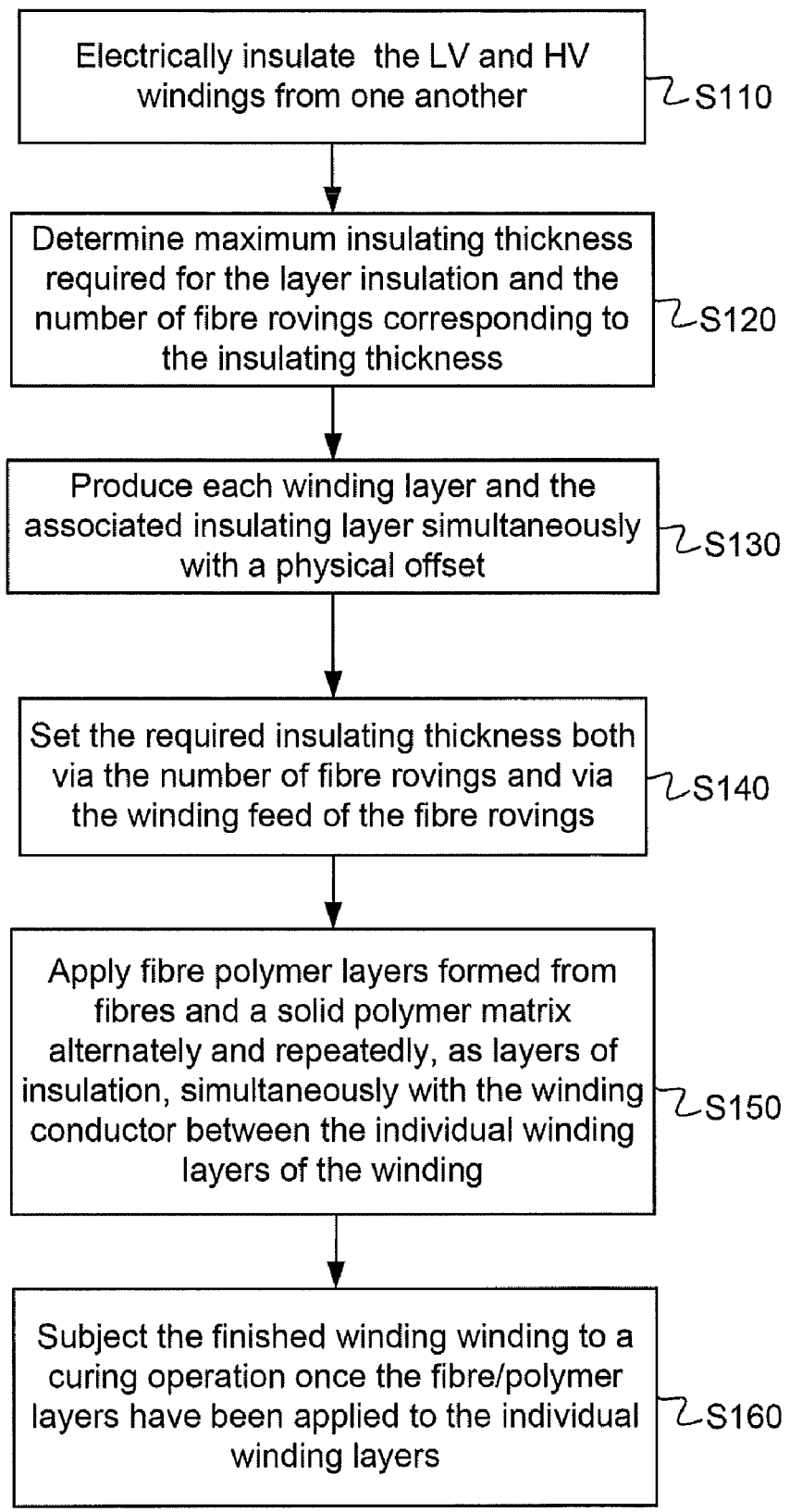

METHOD FOR PRODUCING WINDINGS FOR A DRY-TYPE TRANSFORMER

RELATED APPLICATION

This application claims priority under 35 U.S.C. §119 to European Patent Application No. 10 005 442.8 filed in Europe on May 26, 2010, the entire content of which is hereby incorporated by reference in its entirety.

FIELD

The present disclosure relates to a method for producing windings for a dry-type transformer, and to a winding produced in accordance with such a method.

BACKGROUND INFORMATION

Dry-type transformers are known. With this type of transformer, heat losses occurring during operation are emitted directly to the ambient air. This arrangement is in contrast to so-called oil-type transformers, in which the transformer coils are arranged in a tank filled with insulating oil and the insulating oil performs the additional function of a heat transfer medium and transfers the heat losses to the often ribbed tank wall which is in communication with the ambient air.

A further difference relating to the insulation between the individual winding layers of each coil is that, in the dry-type transformers, the sheet-metal jacket protecting the oil-type transformers from any external effects is dispensed with. Accordingly, the coils of the dry-type transformers or the surface thereof need to have comparable protection without the heat dissipation being substantially impaired thereby.

In order to meet the above requirements, synthetic resin-impregnated fibre rovings, such as those consisting of glass fibres, can be wound around the windings of the coils of dry-type transformers, in a known manner.

In this case, these fibre rovings are each applied in layers and therefore also act as insulation between the individual winding layers. The application of the individual wire layers and the insulating layers is generally performed with the aid of so-called winding apparatuses, which have a similar configuration to a lathe, wherein the subsequent coil former is clamped between a headstock and a tailstock, and the winding wire as well as the fibre rovings are each supplied from the side via a support-like guide carriage.

In order to maintain the predetermined configuration and the dimensions of the winding during manufacture of such a coil and in order to prevent synthetic resin from flowing away in an uncontrolled manner, the drying and curing of the completely wound coil is generally performed under rotation in a special curing furnace.

In order to achieve a formation of the electromagnetic field of the individual coils which is as uniform as possible, the high voltage windings of the transformer coils can be constructed in the form of so-called group windings. In this case, the winding layers are split, with respect to the entire coil length, into a plurality of groups which are located next to one another, but are connected electrically in series with one another. In turn, this procedure requires in each case an interruption in the winding when constructing the individual winding layers, i.e. it is necessary for the insulation of the winding wire associated with this layer to be removed, and once the respective associated insulation layer has been applied, the wire ends are connected to one another in DC-isolated fashion, which generally takes place by means of a soldered joint.

This procedure is time consuming and labor intensive. Furthermore, it requires an increased level of attention from the person performing this procedure.

EP 1941523 B1 discloses a method for producing a resin-insulated coil, wherein the coil is reinforced with fibres which are arranged on the coil in a solid polymer matrix. In this case, a winding layer and a fibre/polymer layer are applied alternately and repeatedly, wherein the application of the fibre/polymer layer includes the following continuously implemented steps: (i) continuous supply of at least one tape, which includes fibres and a solid polymer matrix, (ii) fusing or activation of a section of the at least one tape during the supply, (iii) pressing the fused or activated section of the tape onto the coil during the supply, and (iv) cooling the tape once it has left the heated or activated and pressed zone.

In addition, DE 4445423 A1 discloses a method in which, prior to the application of the low voltage winding, the maximum insulating thickness required for the layer insulation and the number of fibre rovings corresponding to this insulating thickness are determined. Each winding layer and the associated insulating layer are produced simultaneously with a physical offset with respect to one another. The required insulating thickness is set first via the winding feed of the fibre rovings and second via the number thereof.

A characteristic of the last mentioned method is that the fibre rovings are supplied to the winding apparatus from one side, and the winding wire is supplied from the opposite side. In other words, the fibre rovings and winding wire are supplied from different sides. This procedure has the advantage in that the rovings and the wire do not impede one another, for example in the event of a different feed. However, this entails a considerable space requirement during this procedure.

SUMMARY

An exemplary embodiment of the present disclosure provides a method for producing windings for a dry-type transformer which includes a low voltage (LV) winding and a high voltage (HV) winding. The exemplary method includes electrically insulating the LV and HV windings from one another such that layers of the LV and HV windings are electrically insulated from one another by virtue of, initially, the LV winding being produced from electrically conductive wire or tape material and an insulating layer including resin-impregnated fibre material being wound around the LV winding, and the HV winding then being formed on top of said LV winding, such that the individual layers of the HV winding are each insulated from one another by means of resin-impregnated fibre rovings. The exemplary method also includes, prior to application of the HV winding, determining a maximum insulating thickness required for the layer insulation and the number of fibre rovings corresponding to the insulating thickness. In addition, the exemplary method includes producing each winding layer and the associated insulating layer simultaneously with a physical offset with respect to one another, and setting the required insulating thickness both via the number of fibre rovings and via the winding feed of the fibre rovings. In order to produce the winding, fibre polymer layers formed from fibres and a solid polymer matrix are applied alternately and repeatedly, as layers of insulation, simultaneously with the winding conductor between the individual winding layers of the winding, and once the fibre/polymer layers have been applied to the individual winding layers, the finished winding is subjected to a curing operation, such that the prepregs applied to the winding are cured.

BRIEF DESCRIPTION OF THE DRAWING

Additional refinements, advantages and features of the present disclosure are described in more detail below with reference to exemplary embodiments illustrated in the drawing, in which:

FIG. 1 illustrates steps of a method for producing windings for a dry-type transformer according to an exemplary embodiment of the present disclosure.

DETAILED DESCRIPTION

Exemplary embodiments of the present disclosure provide a method for producing windings for a dry-type transformer, where the method can be implemented easily, has a space requirement which is as low as possible and which avoids the above-noted difficulties. Exemplary embodiments of the present disclosure also provide a product that is produced in accordance with this method.

Exemplary embodiments of the present disclosure provide that, in order to produce the winding, fibre/polymer layers formed from fibres and a solid polymer matrix, e.g., so-called prepregs, are applied alternately and repeatedly as layers of insulation between the individual winding layers of the winding simultaneously with the winding conductor. According to an exemplary embodiment, these layers of insulation can be heated during the application. Furthermore, once the layers of insulation have been applied to the individual winding layers, the finished winding can be subjected to a pressing operation with simultaneous heating, with the result that the layers of insulation applied to the winding are cured.

Exemplary embodiments of the present disclosure provide a winding in which the synthetic resin-impregnated fibre rovings used in the conventional construction of dry-type transformers as layer of insulation are dispensed with. Instead of the synthetic resin-impregnated fibre rovings, exemplary embodiments of the present disclosure utilize pretreated continuous fibres, which are known as prepregs in the art, which are continuous fibre bundles which have been impregnated with polymer-based synthetic resin.

As used herein, a prepreg means a semifinished product which is formed from continuous fibres and from a thermoplastic or from an uncured thermosetting polymer matrix and which has multiple applications, for example in lightweight construction for aircraft and motor vehicles. The continuous fibres can, for example, be in the form of simply a unidirectional layer, in the form of a woven fabric or in the form of a scrim. In general, prepregs are delivered in web form, e.g., wound onto rolls.

Prepregs can be machined and are therefore primarily used in automated processes. They give a uniform, high quality. In addition, prepegs have a low undulation and high fibre volume content. As used herein, undulation means the deflection of fibres within woven fabrics, for example, in the case of fibre composite materials. Undulations result in a decrease in the fibre-parallel strength of the woven fabric.

The curing of the prepregs at high temperatures makes short cycle times possible. However, the processing of the prepregs requires a high level of investment, for example, for autoclaves, laying robots and chilled storage.

In accordance with an exemplary embodiment of the present disclosure, when using prepregs as insulating material for the production of insulating layers, the complexity is much lower in comparison with previous manufacturing processes using conventional synthetic resin-impregnated fibre rovings, as will be explained in more detail below.

Thus, in accordance with an exemplary embodiment of the method according to the present disclosure, a UV-curable resin is provided as part of the fibre/polymer layer, wherein the winding is irradiated with UV light during the application, which initially results in activation of the curing reaction of the resin during the winding operation and then results in partial or complete curing of the winding.

The production of the coil winding can be performed without any problems using prepregs with the devices provided for fibre rovings. Advantageously, impregnation with liquid synthetic resin is dispensed with because the prepregs can already be delivered in impregnated form with the polymer-based polymer matrix provided for holding the turns together or for sufficient insulation.

Correspondingly, it is merely necessary for a certain amount of energy in the form of heat to be supplied, with this energy making it possible for the polymer matrix bound in the fibre bundles of the prepreg to be softened. As a result, the individual layers of insulation formed from prepregs can firstly be deformed plastically and combined with one another to form a single body which, after the subsequent curing caused by the heating, is provided with sufficient mechanical rigidity and strength as a result of the cooling.

Another exemplary embodiment of the method according to the present disclosure provides that in order to heat the layers of insulation during the application, an infrared emitter is used to irradiate the coil surface and/or the insulation material or blasting with hot air is performed, which initially results in softening of the resin during the winding operation and then results in partial or complete curing of the winding.

For the application of this exemplary manufacturing embodiment, it is not necessary to provide UV-curable resin as part of the fibre/polymer layer.

In accordance with another exemplary embodiment of the method according to the present disclosure, the heating of the layers of insulation during application using a heated press roller during winding can be provided, which initially results in softening of the resin during the winding operation and then results in partial or complete curing of the winding.

According to an exemplary embodiment of the method of the present disclosure for producing a winding for a dry-type transformer, indirect heating of the winding can also be provided such that, in order to heat the layers of insulation during the application, heating of the winding conductor as a result of the nonreactive resistance thereof is provided, which initially results in softening of the resin during the winding operation and then results in partial or complete curing of the winding.

In this case, an exemplary embodiment of the present disclosure provides that current is sent into the conductor which has been wound onto the coil in each case via sliprings at the start of the conductor and at the end thereof. That is, both conductor ends are connected to an electrical power source and act as resistance heating, which heats the conductor as a result of current flow and therefore also the insulating layers adjacent to the conductor. This curing method can be performed in such a way as to avoid rotation during the curing even without the use of sliprings. Alternatively, the coil can be rotated in alternating fashion merely within a restricted angular range, for example +/−180°, in order to avoid sliprings.

An exemplary embodiment of the present disclosure relates to the effects of the construction of the winding layers or the insulating layers on the response of the electrical field and, in the process, optimization thereof, which is achieved by corresponding winding construction.

Correspondingly, in accordance with an exemplary embodiment of the method according to the present disclosure, provision is made for the layers of insulation between the individual winding layers to be formed stepwise in such a way that the layers of insulation between the first and second layers and those between the second and third layers supplement one another in the cross-sectional view to form a rectangle.

An exemplary embodiment of the method according to the present disclosure provides that by continuously varying the speed of the insulation feed, continuously linearly increasing insulation is achieved, in which the insulation between the first and second layers and that between the second and third layers supplement one another in the cross-sectional view to form a rectangle.

In addition, an exemplary embodiment of the method according to the present disclosure provides that by varying the speed of the insulation feed, a nonlinearly increasing thickness of the layer of insulation results, in which the insulation between the first and second layers and that between the second and third layers supplement one another in the cross-sectional view to form a rectangle.

An exemplary embodiment of the method according to the present disclosure provides that the layers of insulation between two adjacent layers are configured in such a way that they do not supplement one another to form a rectangle, with the result that the outermost surface of the winding does not run parallel to the inner surface.

Exemplary embodiments of the present disclosure also provide a winding which has been produced in accordance with the method mentioned and detailed above, in which the winding has a simple construction, has functionally faultless insulation, is operationally reliable and has sufficient mechanical strength.

Accordingly, the disclosure provides for fibre/polymer layers to be provided, as layers of insulation, alternately and repeatedly between the individual winding layers of the winding, where the fibre/polymer layers are formed from prepregs, e.g., fibre bundles connected with a solid polymer matrix, wherein these layers of insulation are connected to one another.

In this case, the desired high mechanical strength of the winding according to the disclosure is achieved due to the fibre/polymer layers being provided for use are in the form of prepregs, wherein the polymer content of the solid polymer matrix thereof is cured and, as a result, the fibre or fibre bundle is anchored in the polymer matrix.

FIG. 1 is a flowchart illustrating various steps of the method according to an exemplary embodiment of the present disclosure. As noted above, the method can produce windings for a dry-type transformer which includes a low voltage (LV) winding and a high voltage (HV) winding. The exemplary method includes electrically insulating the LV and HV windings from one another (step S120). The LV and HV windings are electrically insulated from one another by virtue of, initially, the LV winding being produced from electrically conductive wire or tape material and an insulating layer including resin-impregnated fibre material being wound around the LV winding, and the HV winding then being formed on top of said LV winding, such that the individual layers of the HV winding are each insulated from one another by means of resin-impregnated fibre rovings. The exemplary method also includes, prior to application of the HV winding, determining a maximum insulating thickness required for the layer insulation and the number of fibre rovings corresponding to the insulating thickness (step S120). In addition, the exemplary method includes producing each winding layer and the associated insulating layer simultaneously with a physical offset with respect to one another (step S130), and setting the required insulating thickness both via the number of fibre rovings and via the winding feed of the fibre rovings (step S140). In order to produce the winding, fibre polymer layers formed from fibres and a solid polymer matrix are applied alternately and repeatedly, as layers of insulation, simultaneously with the winding conductor between the individual winding layers of the winding (step S150). Once the fibre/polymer layers have been applied to the individual winding layers, the finished winding is subjected to a curing operation, such that the prepregs applied to the winding are cured (step S160).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for producing windings for a dry-type transformer which includes a low voltage (LV) winding and a high voltage (HV) winding, the method comprising:

electrically insulating the LV and HV windings from one another such that layers of the LV and HV windings are electrically insulated from one another by virtue of, initially, the LV winding being produced from electrically conductive wire or tape material and an insulating layer including resin-impregnated fibre material being wound around the LV winding, and the HV winding then being formed on top of said LV winding, such that the individual layers of the HV winding are each insulated from one another by means of resin-impregnated fibre rovings;

prior to application of the HV winding, determining a maximum insulating thickness required for the layer insulation and the number of fibre rovings corresponding to the insulating thickness; and producing each winding layer and the associated insulating layer simultaneously with a physical offset with respect to one another, and setting the required insulating thickness both via the number of fibre rovings and via the winding feed of the fibre rovings, wherein in order to produce the winding, fibre polymer layers formed from fibres and a solid polymer matrix are applied alternately and repeatedly, as layers of insulation, simultaneously with the winding conductor between the individual winding layers of the winding, and once the fibre/polymer layers have been applied to the individual winding layers, the finished winding is subjected to a curing operation, such that the prepregs applied to the winding are cured.

2. The method according to claim 1, wherein part of the fibre/polymer layer comprises a UV-curable resin, and the method comprises:

irradiating the winding with UV light during the application, which initially results in activation of the curing reaction of the resin during the winding operation and then results in partial or complete curing of the winding.

3. The method according to claim 1, comprising:

in order to heat the layers of insulation during the application, using an infrared emitter to irradiate at least one of a surface of the coil and the insulation material, which initially results in softening of the resin during the winding operation and then results in partial or complete curing of the winding.

4. The method according to claim 1, comprising:
using a heated press roller during winding to heat the layers of insulation during the application, which initially results in softening of the resin during the winding operation and then results in partial or complete curing of the winding.

5. The Method according to claim 1, comprising:
heating the winding conductor to heat the layers of insulation during the application, which initially results in softening of the resin during the winding operation and then results in partial or complete curing of the winding.

6. The method according to claim 5, comprising:
as the winding rotates, providing current into the conductor which has been wound onto the coil in each case via sliprings at the start of the conductor and at the end thereof.

7. The method according to claim 5, comprising:
when the winding is not rotating, providing current into the conductor which has been wound onto the coil at the start of the conductor and at the end thereof.

8. The method according to claim 5, comprising:
when the winding is rotating alternately in restricted fashion, providing current into the conductor which has been wound onto the coil at the start of the conductor and at the end thereof.

9. The method according to claim 1, wherein the layers of insulation between the individual windings have a constant thickness.

10. The method according to claim 1, wherein the layers of insulation are formed stepwise between the individual winding layers, in which the layers of insulation between first and second layers and the layers between the second and third layers supplement one another in the cross-sectional view to form a rectangle.

11. The method according to claim 1, comprising:
continuously varying the speed of the insulation feed to continuously linearly increasing insulation, in which the insulation between the first and second layers and the insulation between the second and third layers supplement one another in the cross-sectional view to form a rectangle.

12. The method according to claim 1, comprising:
varying the speed of the insulation feed to achieve nonlinearly increasing insulation, in which the insulation between first and second layers and the insulation between the second and third layers supplement one another in the cross-sectional view to form a rectangle.

13. The method according to claim 7, wherein the layers of insulation between two adjacent layers do not supplement one another to form a rectangle, such that an outermost surface of the winding no longer runs parallel to the inner surface.

14. A winding produced in accordance with the method according to claim 1, wherein fibre/polymer layers formed from fibres and a solid polymer matrix are provided alternately and repeatedly as layers of insulation between the individual winding layers of the winding, such that these layers of insulation are connected to one another, and the polymer content of the solid polymer matrix is cured.

15. The method according to claim 1, comprising:
blasting with hot air in order to heat the layers of insulation during the application, which initially results in softening of the resin during the winding operation and then results in partial or complete curing of the winding.

16. The method according to claim 6, comprising:
continuously varying the speed of the insulation feed to continuously linearly increasing insulation, in which the insulation between the first and second layers and the insulation between the second and third layers supplement one another in the cross-sectional view to form a rectangle.

17. The method according to claim 6, comprising:
varying the speed of the insulation feed to achieve nonlinearly increasing insulation, in which the insulation between first and second layers and the insulation between the second and third layers supplement one another in the cross-sectional view to form a rectangle.

18. The method according to claim 8, wherein the layers of insulation between two adjacent layers do not supplement one another to form a rectangle, such that an outermost surface of the winding no longer runs parallel to the inner surface.

19. A winding produced in accordance with the method according to claim 6, wherein fibre/polymer layers formed from fibres and a solid polymer matrix are provided alternately and repeatedly as layers of insulation between the individual winding layers of the winding, such that these layers of insulation are connected to one another, and the polymer content of the solid polymer matrix is cured.

20. A winding produced in accordance with the method according to claim 11, wherein fibre/polymer layers formed from fibres and a solid polymer matrix are provided alternately and repeatedly as layers of insulation between the individual winding layers of the winding, such that these layers of insulation are connected to one another, and the polymer content of the solid polymer matrix is cured.

* * * * *